US008780885B2

(12) United States Patent
Li et al.

(10) Patent No.: US 8,780,885 B2
(45) Date of Patent: *Jul. 15, 2014

(54) SYNCHRONIZATION OF A PEER-TO-PEER COMMUNICATION NETWORK

(75) Inventors: Junyi Li, Bedminster, NJ (US); Rajiv Laroia, Far Hills, NJ (US); Xinzhou Wu, Monmouth Junction, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 716 days.

This patent is subject to a terminal disclaimer.

(21) Appl. No.: 11/775,193

(22) Filed: Jul. 9, 2007

(65) Prior Publication Data

US 2009/0016321 A1    Jan. 15, 2009

(51) Int. Cl.
*H04J 3/06* (2006.01)

(52) U.S. Cl.
USPC .......................................... 370/350; 370/324

(58) Field of Classification Search
USPC ......... 370/324, 328–329, 336–338, 345–350, 370/406, 442, 458, 468, 503–520; 455/422.1, 446, 450–452.1, 500, 13.2, 455/434, 515
See application file for complete search history.

(56) References Cited

U.S. PATENT DOCUMENTS

| | | | |
|---|---|---|---|
| 6,108,324 A | 8/2000 | Brown et al. | |
| 6,842,437 B1 | 1/2005 | Heath | |
| 6,934,723 B2 | 8/2005 | Breiter et al. | |
| 7,039,656 B1 | 5/2006 | Tsai et al. | |
| 7,272,129 B2 | 9/2007 | Calcev et al. | |
| 7,305,011 B2 | 12/2007 | Shae et al. | |
| 7,320,010 B2 | 1/2008 | Peng | |
| 7,403,789 B2 | 7/2008 | Takano et al. | |
| 7,472,254 B2 | 12/2008 | Collins | |
| 7,653,018 B2 | 1/2010 | Regan et al. | |
| 7,983,702 B2 | 7/2011 | Li et al. | |

(Continued)

FOREIGN PATENT DOCUMENTS

| | | |
|---|---|---|
| CN | 1645766 A | 7/2005 |
| JP | 4287532 A | 10/1992 |

(Continued)

OTHER PUBLICATIONS

"Part 15.3: Wireless Medium Access Control (MAC) and Physcial Layer (PHY) Specifications for High Rate Wireless Personal Area Netwroks (WPANs)" IEEE STD 802.15.3-2003, IEEE, US, Jan. 1, 2003, pp. 186-193, XP002998655.

(Continued)

*Primary Examiner* — George Eng
*Assistant Examiner* — Marcus Hammonds
(74) *Attorney, Agent, or Firm* — James K. O'Hare

(57) ABSTRACT

In an ad hoc peer-to-peer communications network, timing synchronization can be facilitated between nodes as a function of a received timing of nearby nodes, as well as a network timing. A first timing reference can be used to determine a symbol timing. A second signal that includes a second timing reference can be used to determine a difference between the symbol timing and the second timing reference. The difference can be used to adjust a symbol timing, which can be transmitted to nearby nodes. The first timing reference and the second timing reference can be received from different sources.

26 Claims, 9 Drawing Sheets

(56) References Cited

U.S. PATENT DOCUMENTS

| | | |
|---|---|---|
| 2004/0076181 A1* | 4/2004 | Pantelias et al. ............. 370/468 |
| 2005/0090200 A1 | 4/2005 | Karaoguz et al. |
| 2005/0135429 A1 | 6/2005 | Bingham et al. |
| 2005/0265306 A1 | 12/2005 | Schrum et al. |
| 2006/0245440 A1* | 11/2006 | Mizukoshi ..................... 370/400 |
| 2007/0058594 A1 | 3/2007 | Bae et al. |
| 2007/0140279 A1* | 6/2007 | Yang et al. .................... 370/406 |
| 2007/0218906 A1 | 9/2007 | Melia et al. |
| 2008/0037593 A1 | 2/2008 | Friedman et al. |
| 2008/0165761 A1* | 7/2008 | Goppner et al. ............. 370/350 |
| 2008/0240073 A1 | 10/2008 | Pun et al. |
| 2008/0247376 A1* | 10/2008 | Del Prado Pavon et al. . 370/345 |
| 2008/0298329 A1* | 12/2008 | Mo et al. ....................... 370/338 |
| 2009/0016320 A1 | 1/2009 | Li et al. |

FOREIGN PATENT DOCUMENTS

| | | |
|---|---|---|
| JP | 2004500764 A | 1/2004 |
| JP | 2005253038 A | 9/2005 |
| JP | 2005341148 A | 12/2005 |
| JP | 2006186474 A | 7/2006 |
| JP | 2006310986 A | 11/2006 |
| JP | 2006311172 A | 11/2006 |
| JP | 2009508435 A | 2/2009 |
| TW | 578430 B | 3/2004 |
| TW | 200705892 | 2/2007 |
| WO | 2005076543 | 8/2005 |
| WO | 2006056174 | 6/2006 |
| WO | 2006067271 | 6/2006 |
| WO | 2006121379 A1 | 11/2006 |
| WO | WO2007040610 A1 | 4/2007 |

OTHER PUBLICATIONS

Chun-Ting Chou et al: "Mobility support enhancrnents for the wimedia UWB MAC protocol" Boradband Netwroks, 2005 2nd International Conference on Boston, MA Oct. 3-7, 2005, Piscataway, NJ, USA, IEEE, Oct. 3, 2005, pp. 213-219, XP010890344.
International Search Report—PCT/US08/068997, International Search Authority—European Patent Office—Dec. 17, 2008.
Written Opinion—PCT/US08/068997, International Search Authority—European Patent Office—Dec. 17, 2008.
NTT DoCoMo et al., "SCH Structure and Cell Search Method in E-UTRA Downlink", 3GPP TSG-RAN WG1 LTE Ad Hoc Meeting, R1-060042, Helsinki, Finland, Jan. 23-25, 2006.
Helmut B, "Blind Estimation of Symbol Timing and Carrier Frequency Offset in Wireless OFDM Systems",IEEE Transactions on Communications, vol. 49, No. 6, Jun. 2001.
Taiwan Search Report—TW097125929—TIPO—Feb. 21, 2012.
Taiwan Search Report—TW097125931—TIPO—Apr. 17, 2012.

* cited by examiner

SYNCHRONIZATION OF A PEER-TO-PEER COMMUNICATION NETWORK

CROSS-REFERENCE

This application is related to patent application Ser. No. 11/775,186 entitled, "SYNCHRONIZATION OF A PEER-TO-PEER COMMUNICATION NETWORK", and co-pending patent application Ser. No. 11/775,191 entitled, "SYNCHRONIZATION OF A PEER-TO-PEER COMMUNICATION NETWORK, which were filed on the same day as this application.

BACKGROUND

I. Field

The following description relates generally to wireless communications, and more particularly to synchronization in ad hoc peer-to-peer networks.

II. Background

Wireless communication systems are widely deployed to provide various types of communication; for instance, voice and/or data may be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless communication networks are commonly utilized to communicate information regardless of where a user is located (inside or outside a structure) and whether a user is stationary or moving (e.g., in a vehicle, walking). Generally, wireless communication networks are established through a mobile device communicating with a base station or access point. The access point covers a geographic range or cell and, as the mobile device is operated, it may move in and out of these geographic cells.

Sometimes a network can be constructed utilizing solely peer-to-peer communication without utilizing access points or can include both access points (infrastructure mode) and peer-to-peer communication. These types of infrastructure are referred to as ad hoc networks or independent basic service sets (IBSS). Ad hoc networks can be self-configuring whereby when a mobile device (or access point) receives communication from another mobile device, the other mobile device is added to the network. As mobile devices leave the area, they are dynamically removed from the network. Thus, the topography of the network can be constantly changing.

To facilitate communications with other devices, synchronization is received from a timing source, which can allow the devices to perform certain functions (e.g., peer discovery, paging, and so forth). However, if there is a timing discrepancy or a timing offset between two or more devices, it can cause problems and can require further synchronization among the devices.

SUMMARY

The following presents a simplified summary of one or more aspects in order to provide a basic understanding of such aspects. This summary is not an extensive overview of all contemplated aspects, and is intended to neither identify key or critical elements nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating synchronization between two or more nodes within a peer-to-peer communications network. Each node can receive network timing from a downlink broadcast signal of a nearby timing source. In a dedicated time interval, each node transmits a wideband signal with its known timing, and listens to wideband signals from other nodes nearby in the remaining portion of the time interval. Each node can adjust its own timing as a function of the received timing of other nearby nodes, as well as the network timing.

In a related aspect is a method of operating a first wireless device for synchronizing communications within a peer-to-peer wireless communications network. The method can include receiving at a first device a first timing reference from a first source and determining a symbol timing based on the first timing reference. A second signal can be received from at least a second wireless device. The second signal can include a second timing reference. The method further includes determining whether the symbol timing and the second timing reference are different and determining a timing adjustment based on the symbol timing and the second timing if it is determined that the symbol timing and the second timing reference are different. The symbol timing can be adjusted based on the timing adjustment and a third signal can be transmitted with the symbol timing.

A further aspect relates to a wireless communications apparatus that comprises a memory and a processor. The memory can retain instructions related to receiving a first timing reference from a first source and determining a symbol timing based on the first timing reference. A second signal that includes a second timing reference can be received from a second source. A difference between the symbol timing and the second timing reference can be found and used to determine a timing adjustment. The memory can also retain instructions related to adjusting the symbol timing based on the determined timing adjustment and transmitting a third signal with the symbol timing. The processor can be coupled to the memory and configured to execute the instructions retained in the memory.

Another aspect relates to a wireless communications apparatus that facilitates synchronization in a peer-to-peer communications network. The apparatus includes a means for receiving a first timing reference and a means for establishing a symbol timing based on the first timing reference. Also included are a means for receiving a second signal that includes a second timing reference and a means for deciding whether the symbol timing and the second timing reference are different. A means for ascertaining a timing adjustment based on the symbol timing and the second timing if it is determined that the symbol timing and the second timing reference are different can be included. The apparatus can further include a means for adjusting the symbol timing based on the timing adjustment and a means for transmitting a third signal with the symbol timing.

Still another aspect relates to a machine-readable medium having stored thereon machine-executable instructions for receiving at a first device a first timing reference from a first source and determining a symbol timing based on the first timing reference. A second signal can be received from at least a second wireless device, the second signal includes a second timing reference. The instructions can include determining whether the symbol timing and the second timing reference are different and determining a timing adjustment based on the symbol timing and the second timing if it is determined that the symbol timing and the second timing reference are different. The symbol timing can be adjusted based on the timing adjustment and a third signal with the symbol timing can be transmitted.

In a wireless communication system, another aspect relates to an apparatus comprising a processor configured to receive a first timing reference from a first timing source. A symbol timing can be established based on the first timing reference. A second signal that includes a second timing reference can be accepted from a wireless device. The processor can further be configured to establish whether the symbol timing and the second timing reference are different and select a timing adjustment based on the symbol timing and the second timing if it is determined that the symbol timing and the second timing reference are different. The symbol timing can be changed based on the selected timing adjustment and a third signal can be transmitted with the symbol timing.

To the accomplishment of the foregoing and related ends, the one or more aspects comprise the features hereinafter fully described and particularly pointed out in the claims. The following description and the annexed drawings set forth in detail certain illustrative examples of the one or more aspects. These examples are indicative, however, of but a few of the various ways in which the principles of various aspects may be employed and the described examples are intended to include all such aspects and their equivalents.

DETAILED DESCRIPTION

Figure 1:
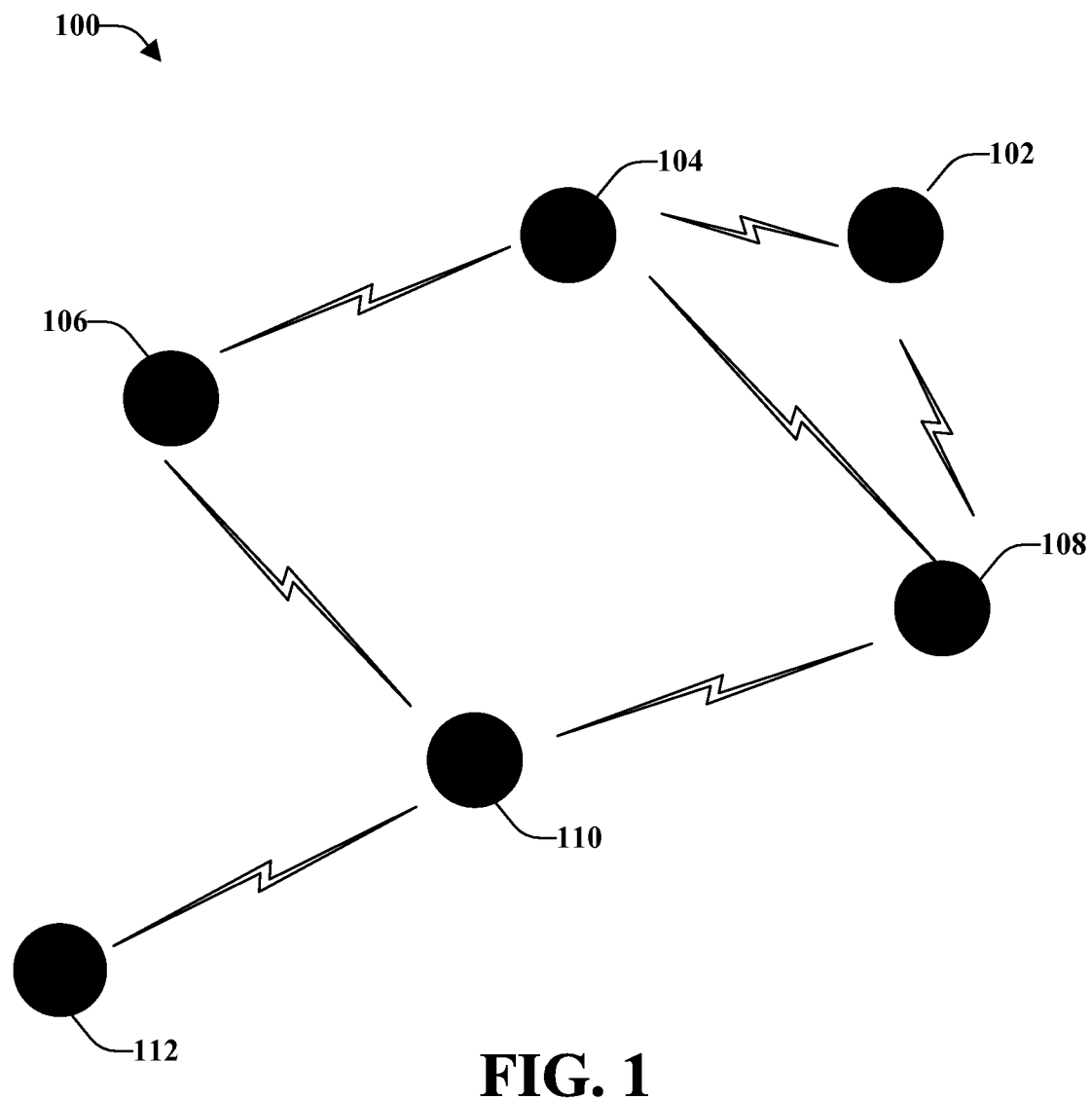
FIG. 1 illustrates a wireless communication network in accordance with various aspects presented herein.

Various examples are now described with reference to the drawings. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing one or more examples.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various examples are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular phone, a cordless telephone, a smart phone, a Session Initiation Protocol (SIP) phone, a wireless local loop (WLL) station, a personal digital assistant (PDA), a laptop, a handheld communication device, a handheld computing device, a computing device, a satellite radio, a global positioning system, a processing device connected to a wireless modem and/or other suitable devices for communication.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication network 100 is illustrated in accordance with various aspects presented herein. Network 100 can be an ad hoc wireless communication network and can be in a peer-to-peer type configuration. A peer-to-peer configuration is a network comprising only nodes, devices, terminals or stations with no access points. In such a network, devices within the network can function similar to base stations and relay traffic or communications to other devices, functioning similar to base stations, until the traffic reaches its ultimate destination. Some ad hoc networks can include both terminals and access points (not shown).

Network 100 can include any number of mobile devices or nodes, of which six are illustrated, that are in wireless communication. Mobile devices can be, for example, cellular phones, smart phones, laptops, handheld communication devices, handheld computing devices, satellite radios, global positioning systems, PDAs, and/or any other suitable device for communicating over wireless communication system 100.

Nodes 102, 104, 106, 108, 110, and 112 are illustrated as configured in a peer-to-peer ad hoc topography. Each node can be within range of one or more other nodes and can communicate with the other nodes or through utilization of the other nodes, such as in a multi-hop topography (e.g., communications can hop from node to node until reaching a final destination). For example, a sender node 102 may wish to communicate with receiver node 112. To enable packet transfer between sender node 102 and receiver node 112, one or more intermediate nodes 104, 106, 108, and/or 110 can be utilized. It should be understood that any node 102-112 can be a sender node and/or a receiver node and can perform functions of either sending or receiving information at substantially the same time (e.g., can broadcast or communicate information at about the same time as receiving information).

Each node can receive a timing reference signal from a timing source, such as a network broadcast source, which can be a terrestrial base station, a terrestrial television or radio transmitter, a satellite transmitter, or combinations thereof. In accordance with some aspects, the timing source can be a peer device (e.g., another wireless terminal). Each node in a network can receive a timing reference signal from the same timing source or from different timing sources. For example, a first device can receive timing from timing source A and a second device can receive timing from b timing source B. It should be understood that the timing between the nodes (e.g., the timing reference associated with each respective node) could be slightly offset (e.g. 1 microsecond, 0.02 microseconds, and so forth) with minimal problems, since there should be overlap in the communications. However, if the nodes do not have a similar timing (e.g., there is more than a minimal amount of offset, such as 6 microseconds) it can cause problems and synchronization should be executed to allow the nodes to perform various functions (e.g. communication, peer discovery, and so forth).

A particular time interval can be established or selected during which each node can transmit a wideband signal (e.g. OFDM, PMCA, or another signal). Each node can transmit during its respective chosen time intervals (e.g. a selected fraction of a time signal) and listen during the other time intervals (e.g. the non-selected fractions of a time signal). There can be a multitude of different ways to establish when to transmit and when to listen (e.g., transmitting and listening generally do not occur at the same time). For example, a node can transmit during each signal, but only for a mini-portion or subset of the chosen time signal. In accordance with some aspects, the node can transmit during the entire time interval, but not during each signal (e.g., transmit during one signal and listen during the next signal). Overall there is some established time interval, which might not be contiguous, and each node can transmit during a certain (e.g., small) fraction of the time interval (e.g., its respective selected portion) and listen during the remaining intervals (e.g., non-selected portions).

Each node can include a memory and a processor, coupled to the memory, configured to execute the instructions retained in the memory. In accordance with some aspects, the memory can retains instructions related to ascertaining a first symbol timing and receiving a first timing synchronization signal. A timing adjustment can be established based in part on the received first timing synchronization signal. Memory can further adjust the first symbol timing as a function of the established timing adjustment; and convey the adjusted symbol timing with a second timing synchronization signal to other devices.

Additionally or alternatively, the memory can retain instructions related to changing the first symbol timing to the adjusted symbol timing. Memory can proceed to repeat the steps of receiving a second timing synchronization signal, establishing a timing adjustment based in part on the second received timing synchronization signal, adjusting the symbol timing as a function of the established timing adjustment; and conveying the adjusted symbol timing with a subsequent timing synchronization signal.

In accordance with another aspect, memory can be configured to retain instructions related to receiving a timing reference, determining a series of timing synchronization time intervals and determining a symbol timing. Memory can choose a fraction of at least one of the series of timing synchronization time intervals to transmit a first signal that includes the symbol timing. Memory can further retain instructs related to receiving a second signal during a non-chosen fraction of the at least one time interval, determining a timing adjustment based on the symbol timing and the second timing reference, and changing the symbol timing based on the timing adjustment.

Additionally or alternatively, memory can retain instructions related to transmitting a next signal with the adjusted timing reference during a timing synchronization interval subsequent to the at least one timing synchronization interval. In accordance with some aspects, memory can retain instructions related to receiving a multitude of signals during a non-chosen fraction of the at least one time interval. Each of the multitude of signals can include a second timing reference. Memory can further determine a composite timing reference value as a function of the timing references received in the multitude of signals and determine a timing adjustment as a function of the first timing reference and the composite timing reference value.

In accordance with another aspect, memory can retain instructions related to receiving a first timing reference from a first source, determining a symbol timing based on the first timing reference and receiving a second signal that includes a second timing reference from a second source. A difference between the symbol timing and the second timing reference can be found and using the difference to determine a timing adjustment. Memory can adjust the symbol timing based on the determined timing adjustment and transmit a third signal with the symbol timing.

Figure 2:
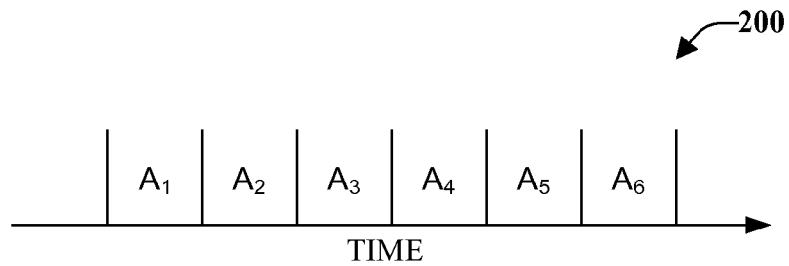
FIG. 2 illustrates an example timing interval in accordance with the one or more disclosed aspects.

An illustration of an example timing 200 example timing interval in accordance with the one or more disclosed aspects is illustrated in FIG. 2. The horizontal line 202 represents "time" and six time intervals, labeled $A_1$, $A_2$, $A_3$, $A_4$, $A_5$, and $A_6$, are illustrated. A first node can randomly (or in some other manner) select a time, such as $A_1$, during which (e.g., the entire interval of $A_1$ or a sub-portion thereof) to transmit a signal (e.g., a wideband signal) that can include the timing reference. In the other time intervals (e.g. $A_2$, $A_3$, $A_4$, $A_5$, and $A_6$) the first node listens for signals being broadcast from other nodes. A second node might choose time interval $A_2$ (or any other time interval) during which to transmit and listens in the remaining (e.g., non-chosen) time intervals, $A_1$, $A_3$, $A_4$, $A_5$, and $A_6$. The first node can hear (e.g., receive) the signal from the second device during interval $A_2$. Other nodes can be transmitting during the other time intervals or sub-portions thereof (including sub-portions of $A_1$ and/or $A_2$). It should be noted that while a node is transmitting a signal, it is might not receive signals from other nodes at substantially the same time.

As signals from other nodes are received, the timing associated with the received signals, and associated timing offset, can be determined. The first node, receiving the signal from the second node, can notice that the timing of the second node is slightly different, or offset by a value τ. The first node can calculate a difference between its timing or a timing received from a timing source and the timing received from a peer node. The node might determine that it should adjust its clock (e.g. synchronize its timing) with the timing information from the second node (e.g., second node's clock). Thus, first node can adjust its own timing as a function of the timing that is derived from the signals received (e.g., peer devices, directly from timing source). For example, if first node's timing or clock is faster than a second node's clock, first node can slow down its clock a little and second node can speed up its clock, as one way of performing timing synchronization.

As the nodes modify their respective timing, the timing information continues to be sent at the appropriate chosen time interval. As each node receives the timing information of the other nodes, the timing of each node might change as more information is received (e.g., each node can be synchronizing at substantially the same time). In such a manner, the peer-to-peer network can function similar to a local open loop network. When communication (e.g., paging, send traffic, and so forth) is to be established, the modified timing of each node (e.g., timing synchronization) can be used for such communication.

Figure 3:
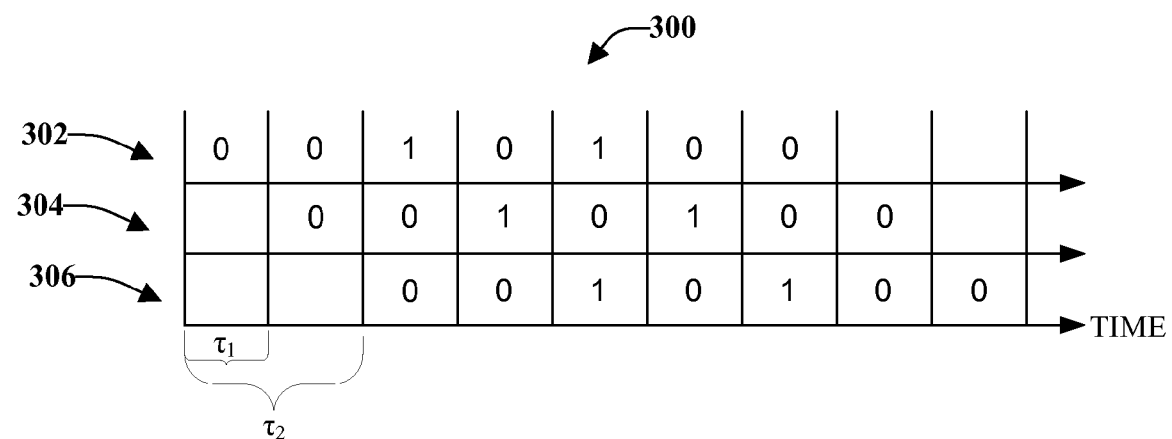
FIG. 3 illustrates an example representation of a timing offset in accordance with the various aspects disclosed herein.

FIG. 3 illustrates an example representation of a timing offset in accordance with the various aspects disclosed herein. It should be understood that although this example represents a CDMA signal, other signals (e.g., wideband signals) can be utilized with the disclosed aspects. A signal, such as 0010100 (illustrated at 302) can be transmitted by a first node. A second node sends a signal (illustrated at 304), which might be offset by $\tau_1$. Another node can send a signal (illustrated at 306), which is offset by $\tau_2$. Each offset can be small and a performance of the timing solution can be a function of the signal (e.g., the wider the band of the signal the better the performance). It should be understood that although the illustration shows the timings as being offset as later (+) in time than an expected signal, one or more signals can be earlier (-) in time or offset by a larger portion than the offsets shown and described.

There are at least four different ways that the timing can be adjusted in order to perform timing synchronization within a peer-to-peer communications network. These four different scenarios include averaging; averaging if timing is earlier; dead zone; and timing source considerations. Each of these different ways of adjusting timing will be discussed in more detail below.

An example relating to "averaging" includes a timing of a first node (T0). The first node receives a signal T1 that can include a timing that is offset (later (+) or earlier (-)), by an amount, $\tau_3$. One or more other signals can be received, such as signal T2, which can include a timing that is offset (later (+) or earlier (-)), by a second amount, $\tau_4$. First node, based on the received timing information included in the received signals T1 and T2, can determine a new timing $T0_A$ by determining an average of the offsets $\tau_3$ and $\tau_4$ of the received signals and adjusts its timing as a function of the determined average. In accordance with some aspects, the average is a weighted average, which can be a function of a received signal strength of a corresponding signal. The average may or may not include the timing of first node.

A challenge with adjusting timing by averaging exists because the received timings can result in lost time. For example, if a node has just synchronized with at least a second node, the clocks should be identical. However, by the time the signal from the second node is received at the first node, it is already late due to the propagation delay from the second node to the first node. Thus, if the average of the timing information in the received signal is used to synchronize, the average is later in time and is transmitted to the second node, which adjusts its timing accordingly (based on the later timing). Thus, the clocks can continue to lose time due to a propagation delay (e.g., time delay from when signal is sent to when it is received).

To mitigate the propagation delay, another factor can be utilized in addition to the average of the received signal. This factor includes whether the average of the received signals is earlier or later than the timing of the calculating node (e.g., the node that received the timing information.). The calculating node can use the average of the received timing information to adjust its clock for timing synchronization if the average results in a timing that it is earlier than the time of the calculating device. If a first node receives a timing or an average of timings that is slower or later than the timing of first node's clock (e.g., the node is the timing leader), first node ignores the received timing and/or the calculated average.

In the above-described scenario, two or more nodes can be maximally offset by a propagation delay. If a second node receives first node's timing, which is offset by a propagation delay, the second node's clock is earlier and it ignores first node's timing. Thus, second node's clock is now offset by the propagation delay. It should be noted that propagation delay does not vary by a large amount.

Another way of performing timing synchronization is to use a dead zone, which can result in a robust timing synchronization. In this scenario, if a first node determines that the timing received from peer nodes is offset, the average of the timing offsets can be found. If the average is earlier than first node's clock, the first node adjusts its timing to synchronize with the average. However, if the average is later than first node's clock, first node establishes a dead zone, which can take into account the location of the other nodes and can be a distance in relation to the first node, which can be a pre-established distance.

When a determination is made to consider a dead zone, timing information received from nodes outside that zone (e.g., too far away from the timing of first node) will be disregarded, which might resulting in a new average being calculated. If the average timing of the nodes within the dead zone is earlier than first node's clock, the first node adjusts its timing to account for the difference between its timing and the average timing in order to synchronize with the average. If the average timing of the nodes within the dead zone is later than first node's clock, the first node ignores the timing information and does not modify its own timing. Alternatively, an average timing of the timing information received from all nodes is first calculated. If the average timing is within the dead zone (e.g., too close from the timing of the first node), the first node ignores the timing information and does not modify its own timing. In accordance with some aspects, the dead zone (e.g. distance from the node) can be modified (e.g., shorter distance, longer distance) based on information received with the timing information. The timing of the node (e.g., adjusted or not adjusted) is transmitted to neighboring nodes in a next selected time interval.

Figure 4:
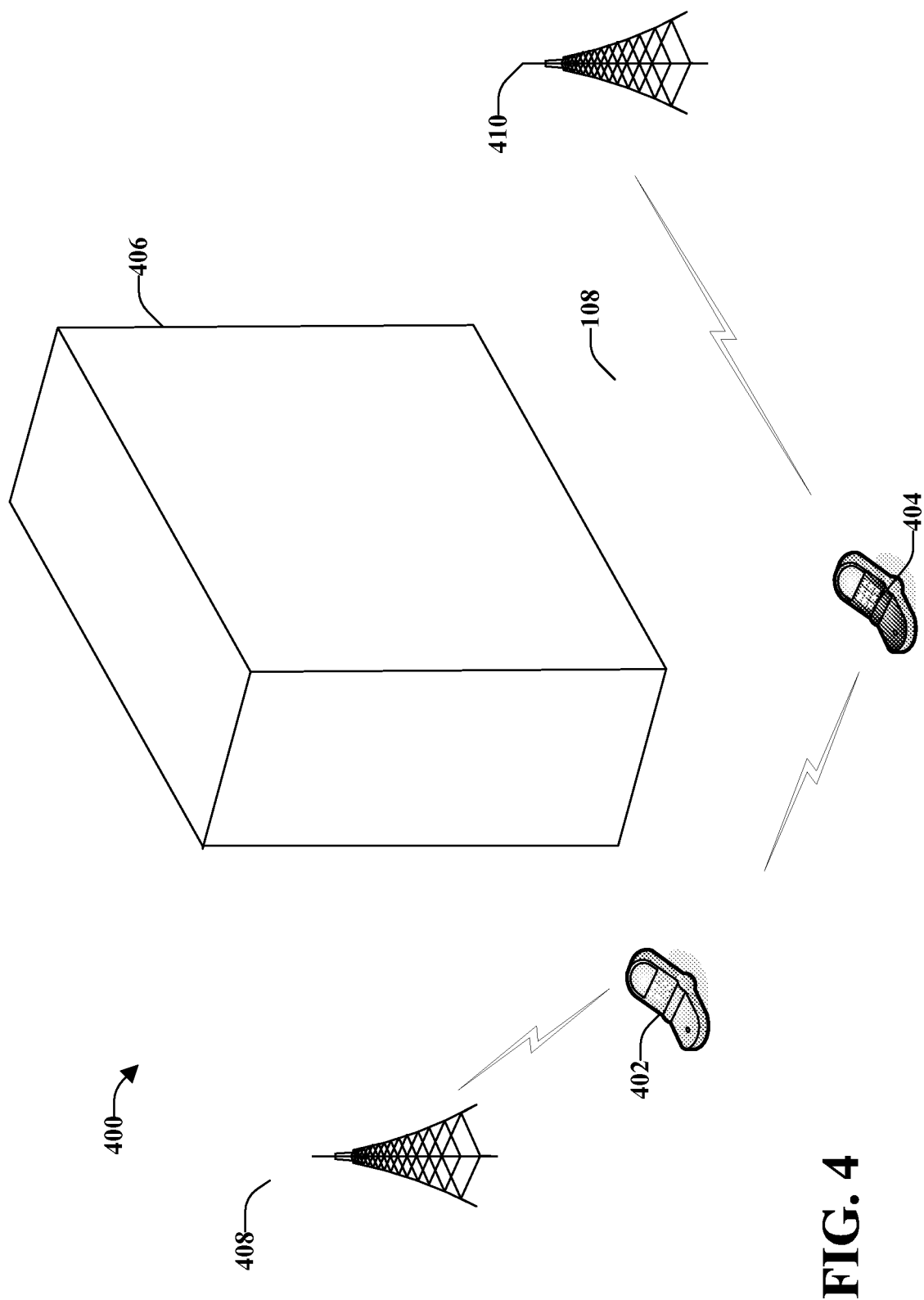
FIG. 4 depicts an example illustration of synchronization as a function of a timing source in accordance with an aspect.

Another scenario for synchronizing timing between nodes considering a timing source that provided a timing reference signal. In this scenario, the nodes within the peer-to-peer network take into account the infrastructure (e.g., base station) network to facilitate synchronization of peer nodes. An example illustration of synchronization as a function of a timing source in accordance with an aspect is illustrated in FIG. 4.

In the example of this figure, two nodes 402 and 404 are located on a street corner (although the nodes could be locates in a variety of other places), one node 402 is on one side of a building 406 and the other node 404 is on adjacent side of the building 406. The nodes 402, 404 in this example are located so that they can communicate directly to each other, in a peer-to-peer fashion. However, each node 402, 404 has obtained a timing reference from a different timing source, such as base stations 408 and 410 due to the location of each node 402, 404 (e.g. the building 406 is blocking communications to both nodes 402, 404 from a single timing source). Thus, node 402 is receiving timing from base station 408 and node 404 is receiving timing from base station 410. It should be understood that although base stations are illustrated as the timing sources, other devices, such as GPS satellites, could be utilized as a timing source.

If the timing from both sources 408, 410 are similar, the nodes 402, 404 can communicate in a peer-to-peer manner, can perform peer discovery, paging, and other functions. However, if the timing is different or offset by a certain amount (e.g., meets or exceeds a threshold-offset level, which can be predetermined level or amount), the nodes 402, 404 should perform a timing synchronization.

Figure 5:
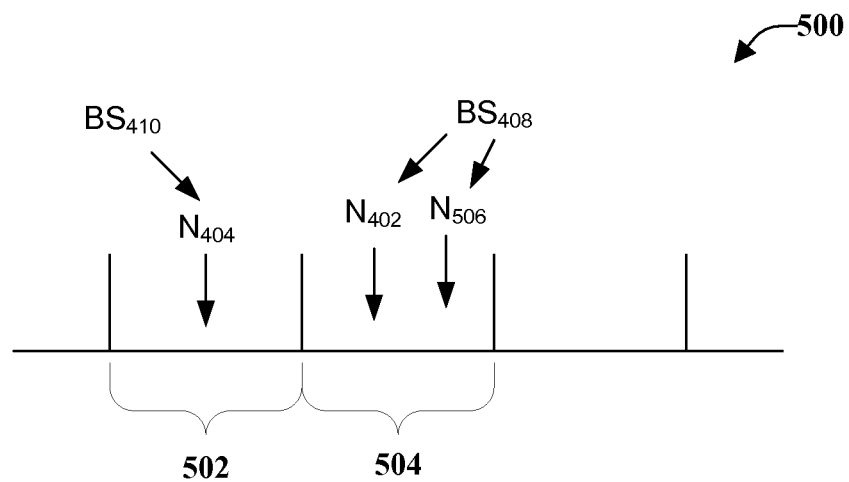
FIG. 5 illustrates an example sequence of timing synchronization intervals.

To continue this example, reference is now made to FIG. 5, which illustrates an example sequence of timing synchronization intervals 500. The timing is divided into blocks, such as blocks or bins 502 and 504, although the timing can be divided into more blocks than the two shown and described. Base station 408 information, including a base station identifier and timing information, is sent during time block 504 and base station 410 information, including a base station identifier and timing information, is sent during time block 502. Node 402 cannot receive a signal directly from base station 410 and node 404 cannot receive a signal directly from base station 408 (as per the above example).

Base station 408 is providing timing information to node 402 and base station 410 is providing timing information to node 404. Thus, node 402 can hash its timing information and transmit a signal during timing interval represented by bin 504 and node 404 can hash its timing information and transmit a signal during timing interval represented by bin 506. The bins or timing intervals for each node can be pre-selected. The next time that information is transmitted by nodes 402 and 404, the hashed information can be placed in a different block or bin, which can be a function of a timing source.

If there is a third node, such as node 506, that receives its timing from base station 408, node 506 can hash its timing information in the same bin 504 as node 402, however, it can select a different portion of the bin 504. Node 402 and node 506 might not receive transmissions sent by each other because the nodes are transmitting at a similar time. Additionally, nodes 402 and 506 are already synchronized because they derived their respective timing reference from the same timing source (e.g. base station 408), and thus, do not have to receive timing information from each other.

Node 404 receives its timing from a different timing source (e.g., base station 410), thus, its timing information is hashed into a different bin (e.g., block 502). Nodes 402 and 506 can receive a signal, which can include timing information, from node 404, because they are transmitting during time interval represented by bin 504 and listen during the other time intervals. Similarity, node 404 can receive signals, which can include timing information, from nodes 402 and/or 506, during non-selected bins or timing intervals (e.g., intervals other than bin 502 in this example). The nodes can acknowledge that they have different clocks and can determine whether or not to adjust or synchronize their timings, depending on various factors including a timing offset amount, the relationships of the timing (e.g., earlier or later), a dead zone.

For example, if nodes 402 and 506 have an earlier timing, node 404 might adjust its timing; or if node 404 is earlier, nodes 402 and 506 might adjust their respective timings. However, a timing should not be adjusted or synchronized if the timing received from the other node(s) is later (e.g., to mitigate propagation delay errors).

In accordance with some aspects, a determination can be made whether a node received its timing directly from a timing source or indirectly (e.g., through a peer node). A device that receives its timing directly from a timing source can be considered to have a more reliable timing reference than a device that synchronized its timing based on a timing reference received from a peer node (e.g., indirectly).

A timing reference received indirectly (e.g., one level indirect, two-levels indirect and so forth) can be considered less reliable because it might not be known from where the timing reference was originally derived. Thus, a device can include information in its signal that includes data relating to the source of the timing information. In accordance with some aspects, if a device receives its timing indirectly (e.g., from a peer node) it might be configured so that the timing information is not transmitted to peer devices and/or a receiving device can be configured to determine whether it will rely on the information received if the timing source was an indirect timing source. Monitoring timing reference integrity can mitigate the occurrence of a defective device (or malicious device) from propagating errors throughout a network. In some embodiments, an indirect timing source may be limited to be propagated to a maximum of K hops, where K is a small integer, such as K=1, 2, or 5.

Thus, a node can transmit its location, a waveform, or some other data with the timing information. If an indication of a timing source is included (e.g., base station identifier), it can influence which bin, block, or selected time interval during which a signal is transmitted.

Figure 6:
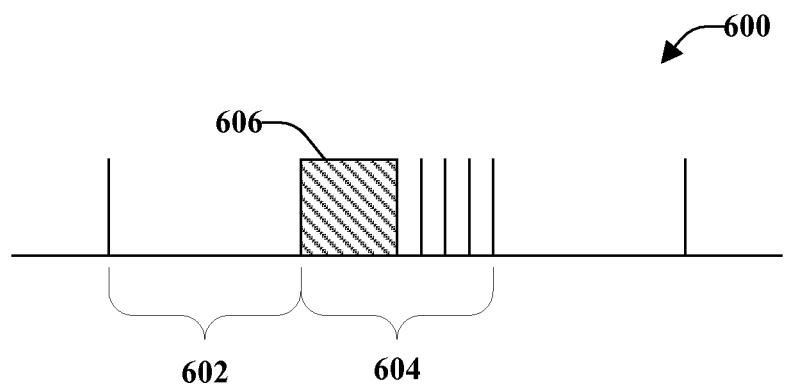
FIG. 6 illustrates another example of a timing interval in accordance with the disclosed aspects.

FIG. 6 illustrates another example of a timing interval in accordance with the disclosed aspects. Two timing intervals, represented as bins or blocks 602, 604, are illustrated, although a timing reference signal can be divided into any number of timing intervals. A first portion 606 (or another portion) of block 604 can be reserved for peer discovery purposes, for example. The second half of block 604 can be divided into further bins or blocks (of which four are illustrated), during which a wideband signal can be transmitted for timing purposes. An identification of a timing source and its timing information can be hashed into one of the four bins to be transmitted in a signal. All nodes that receive timing from the same timing source can hash their respective information into another portion of the bin (e.g. the nodes can transmit timing information at substantially the same time). The bin in which a particular node transmits information can be a function of its identifier, a timing source identifier, a time reference, or combinations thereof. The peer or timing source identifier can be hashed so that there are not repeated collisions.

One or more of the bins or timing intervals or subsets thereof can be designated for an indirect timing signal. In such a manner, if a node synchronizes its timing based on timing information received from an indirect timing source (e.g., peer node) the timing interval selected is a function of the identifier associated with the indirect timing source. Thus, other nodes, receiving the timing information can determine that the timing information is based on an indirect, and potentially unreliable, source, which can enable the nodes to selectively determine whether to utilize the received timing information.

For example purposes and not limitation, nodes c1, c2, and c3 receive timing from the same source. In this scheme, c1, c2, and c3 will hash into the same bin and will not see timing offsets among themselves because they hash into the same bin and transmit (or occupy) the entire bin (e.g. cannot receive at substantially the same time as receiving). This is acceptable since the timing is from the same source and should not be offset by larger than a threshold amount.

Figure 7:
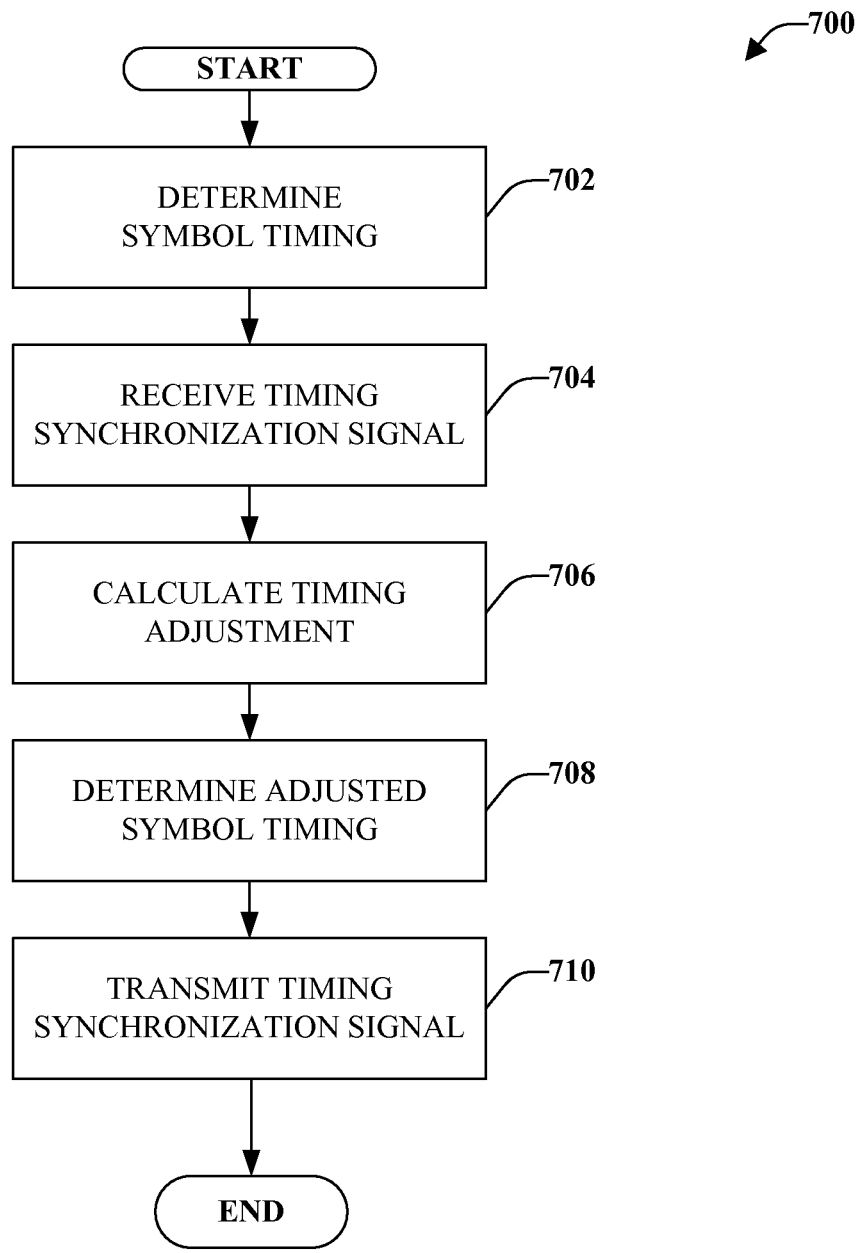
FIG. 7 illustrates a method of operating a wireless communications terminal.
Figure 8:
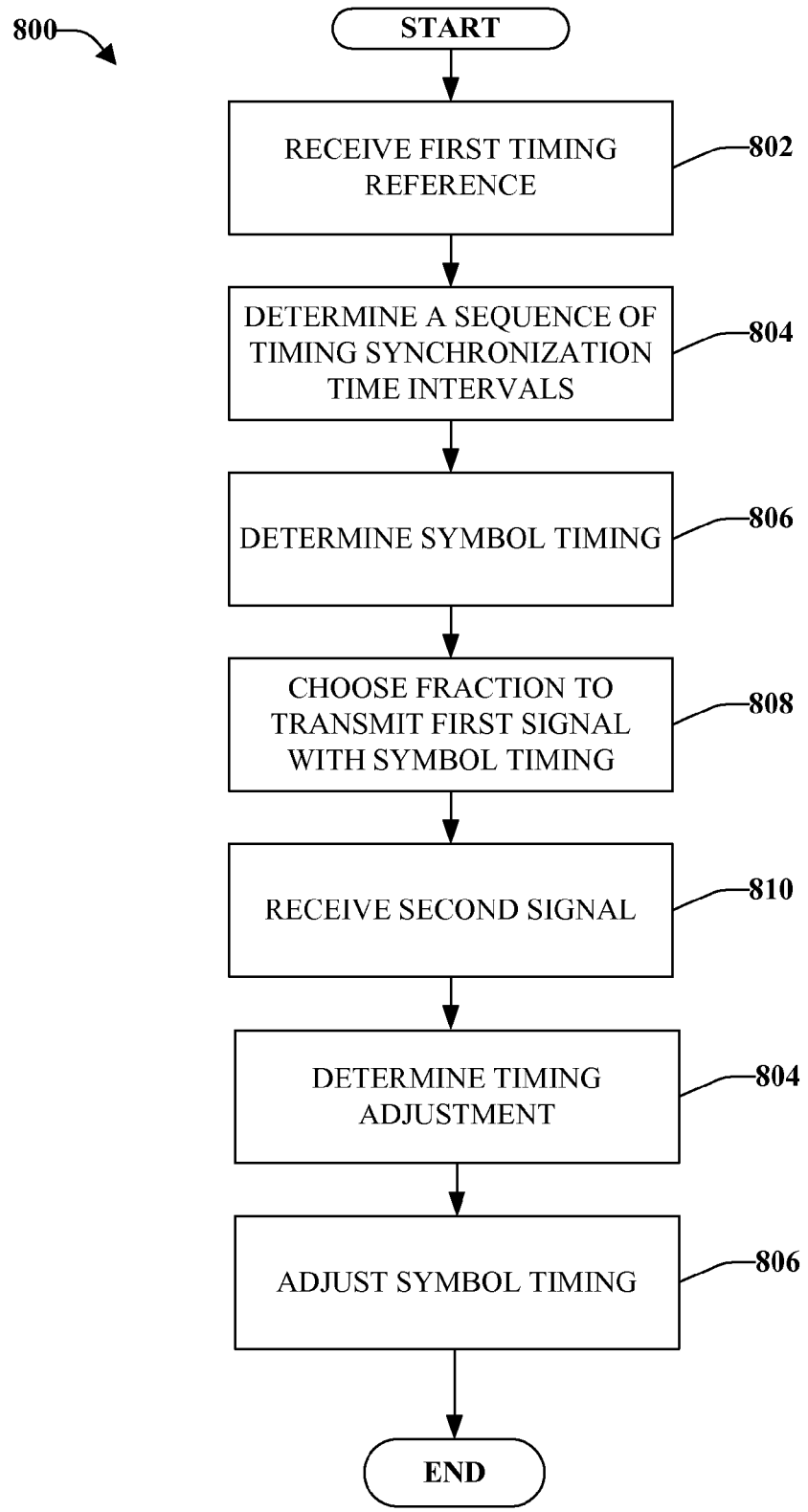
FIG. 8 illustrates a method for time synchronization within a wireless communications network.
Figure 9:
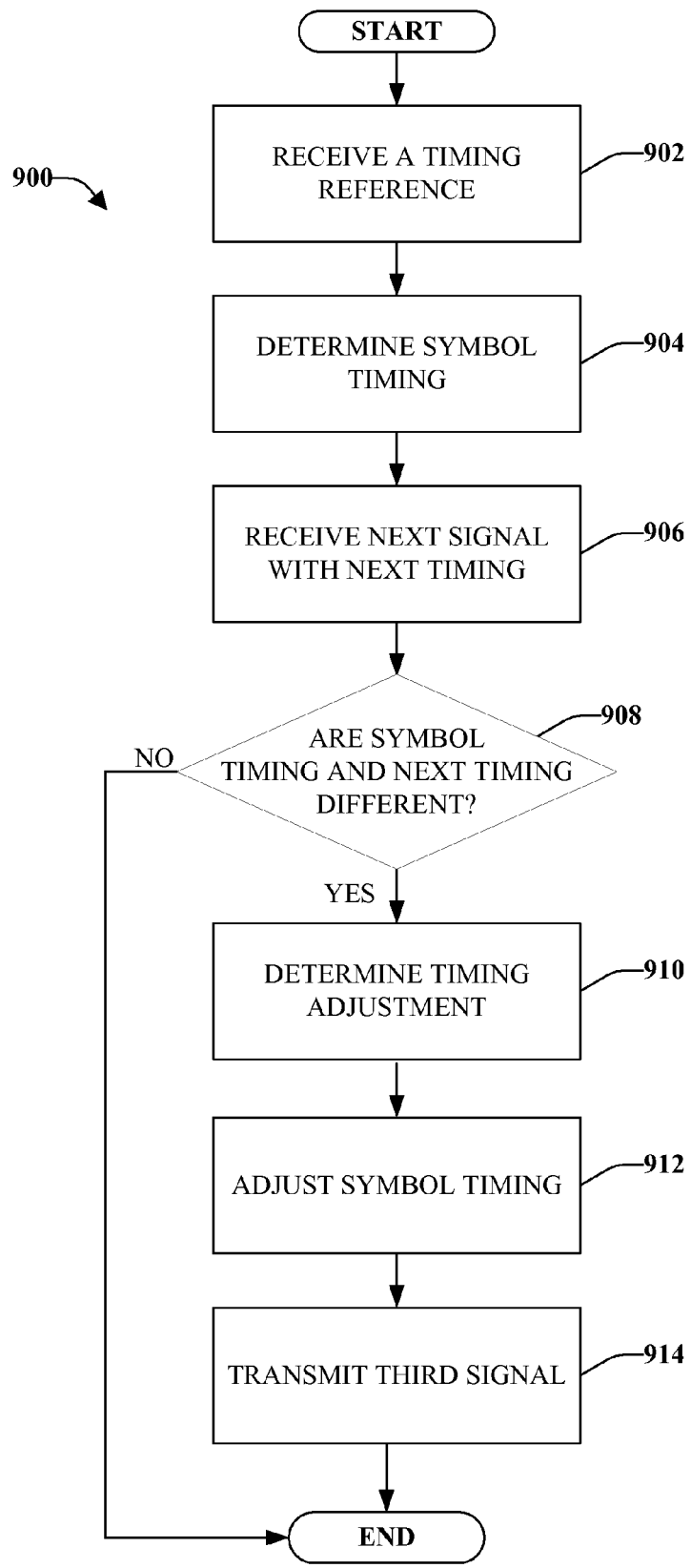
FIG. 9 illustrated is a method of operating a wireless device for synchronizing communications within a peer-to-peer wireless communications network.

Referring to FIGS. 7-9, methodologies relating to synchronization in a local peer-to-peer area are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Now turning to FIG. 7, illustrated is a method 700 of operating a wireless communications terminal. Method 700 can facilitate timing synchronization between two or more terminals and starts, at 702, when an original symbol timing is determined. The original symbol timing can be determined from a timing reference signal received from a network broadcast source. Examples of a network broadcast source include a terrestrial base station transmitter, a terrestrial television or radio transmitter, or a satellite transmitter, or combinations thereof. A sequence of timing synchronization time intervals to be used for receiving timing synchronization signals from other wireless communications terminals can be determined based on the timing reference signal. The other wireless communications terminals can be peer devices operated in a peer-to-peer communications system.

At 704, a timing synchronization signal is received from one or more wireless communications terminals. The first timing synchronization signal can be received in a timing synchronization time interval, wherein the timing reference signal is divided into a multitude of timing synchronization time intervals. At 706, a timing adjustment can be calculated based in part on the at least one of the sequence of timing synchronization signals received. Note that the present wireless terminal may not have an active connection with any of those wireless terminals for user data communications while the present wireless terminal is carrying out the operation of timing synchronization with those wireless terminals.

An adjusted symbol timing can be determined, at 708, by adjusting an original symbol timing by an amount determined by the calculated timing adjustment. A second timing synchronization signal with the adjusted symbol timing can be transmitted, at 710. The second timing synchronization can be transmitted in a portion of a second timing synchronization time interval, selected from the multitude of timing synchronization time intervals. In accordance with some aspects, before the second timing synchronization signal is transmitted, a portion of the second time interval can be chosen as a function of an identifier of the network broadcast source, an identifier of the first terminal, a random number, or a pseudo random number, or combinations thereof. A remaining portion of the second time interval can be a portion during which timing synchronization signals transmitted by other wireless communications terminal is received.

In accordance with some aspects, method 700 can further include transmitting another signal with the original symbol timing in a portion (or more) of another timing synchronization time intervals chosen from the multitude of timing synchronization time intervals.

Method 700 can return to 702, by changing or setting the original (or previous) symbol timing to be equal to the adjusted symbol timing, determined at 708. Method 700 can repeat by receiving a next timing synchronization signal from one or more wireless communication terminal, at 704, calculating a timing adjustment based in part on the timing synchronization signal, at 706, determining a new adjusted symbol timing based on the calculated timing adjustment, at 708, and transmitting a timing synchronization signal with the new adjusted symbol timing, at 710. It is to be understood that this act can be continuous such that any number of time synchronization signals can be received and any number of adjusted symbol timings can be calculated and transmitted.

FIG. 8 illustrates a method 800 for time synchronization within a wireless communications network. At 802, a timing reference is received from a source, which can be a terrestrial base station transmitter, a terrestrial television or radio transmitter, or a satellite transmitter, or combinations thereof. At 804, based on the received timing reference, a sequence of timing synchronization time intervals is determined and, at 806, a symbol timing is determined.

A fraction of one or more of the timing synchronization time intervals is chosen, at 808, to transmit a signal that includes the symbol timing. During a non-chosen fraction of one or more time signals, a second signal that includes a second timing reference can be received, at 810. A timing adjustment can be determined, at 812, based on the symbol timing and the second timing reference. The symbol timing can be adjusted, at 814, based on the determined timing adjustment. A next (e.g. third) signal can be transmitting with the adjusted symbol timing during a fraction in a timing synchronization interval subsequent to the at least one timing synchronization interval.

In accordance with some aspects, method 800 can include receiving a multitude of signals during a non-chosen fraction of the one or more time intervals, wherein the multitude of signals can include a second signal. Each time interval can include a timing reference, which can include the second timing reference. A composite timing reference value can be determined as a function of the timing references of the multitude of signals. The composite timing reference value can be an average of the timing references of the multitude of signals. In accordance with some aspects, the timing reference value can be a weighted average of the timing references of the multitude of signals. A weight of each timing reference used to calculate the weighted average could be a function of a received signal strength of a corresponding signal. In accordance with some aspects, the composite timing reference value can be an earliest timing reference among the timing references of the multitude of signals. The method can include basing a timing adjustment on the first timing reference and the composite timing reference value.

Before determining the timing adjustment, a determination can be made whether the composite timing reference is earlier than the symbol timing. Method 800 can further include calculating an acceptance time interval and determining that the timing adjustment is zero if the composite timing reference is outside the acceptance time interval. The acceptance time interval can start from a time instant that is a first amount earlier than the symbol timing and ending at another time instant that is a second amount later than the symbol timing. The first and second amounts can be, at most, about one fifth (⅕) of a symbol duration of the second signal. In accordance with some aspects, the second amount can be zero.

Additionally, method 800 can determine the timing adjusted so that the symbol timing is delayed by a third amount if the symbol timing is earlier than the composite timing reference and determine the timing adjustment so that the symbol timing is advanced by a fourth amount if the composite timing reference is earlier than the symbol timing. The third and fourth amount can be, at most, about one fifth (⅕) of a symbol duration of the second signal.

With reference now to FIG. 9, illustrated is a method 900 of operating a wireless device for synchronizing communications within a peer-to-peer wireless communications network. At 902, a timing reference is received, at a wireless device, from a source, which can be a terrestrial base station transmitter, a terrestrial television or radio transmitter, or a satellite transmitter, or combinations thereof. In accordance with some aspects, the source can be another wireless device.

At 904, a symbol timing can be determined based on the timing reference. A next signal that includes a timing reference can be received, at 906, from a second wireless device. In accordance with some aspects, the second wireless device is different from the wireless device that is the source of the timing information. The second wireless device can derive its respective timing reference from a source that is different from the source that provided the timing reference received, at 902.

A determination is made, at 908, whether the symbol timing and the next timing reference are different. If the timing references are different, at 910, a time adjustment is determined based on the symbol timing and the next timing. The symbol timing can be adjusted, at 912 based on the determined timing adjustment and a next signal can be transmitted, at 914, with the symbol timing that has been adjusted.

Method 900 can further include setting a timing source identifier of the wireless device as a function of the first source. The timing source identifier can be a non-null value, if the first source is at least one of a terrestrial base station transmitter, a terrestrial TV or radio transmitter, or a satellite transmitter, or combinations thereof. In accordance with some aspects, the source is another wireless device and the timing source identifier is set to a null value. A sequence of timing synchronization time intervals can be determined based on the first time reference. Prior to receiving the second signal, a fraction in one or more timing synchronization time intervals can be chosen in which to transmit a first signal with the symbol timing and the second signal can be received during a non-chosen fraction of the one or more chosen time intervals.

The chosen fraction can be a function of the timing source identifier of the first device and a timing source identifier of the second device can be derived based on the fraction in which the second signal is received in the one or more time intervals. In accordance with some aspects, the timing adjustment can be determined to be zero if the timing source identifier of the second device is null.

Method can include comparing the second timing reference with the symbol timing and determine that the timing adjustment is zero if it is determined that the symbol timing is earlier than the second timing reference. The second timing reference can be compared with the symbol timing and the timing adjustment can be determined as a function of the second timing reference. The timing source identifier of the first device can be set to null if it is determined that the second timing reference is earlier than the symbol timing and the second device is non-null.

The third signal can be transmitted in a fraction of a subsequent timing synchronization time interval. The fraction can be a function of the timing source identifier of the first device. The timing synchronization time interval can be divided into a multitude of slots N and the first signal can be transmitted in one of the multitude of slots N as a function of the timing source identifier of the first device. In accordance with some aspects, N is at least three. The first signal can be transmitted in one of a first predetermined subset of the N slots if the timing source identifier of the first device is non-null and the first signal can be transmitted in one of a second predetermined subset of the N slots if the timing source identifier of the first device is null. The second subset can include one slot.

It will be appreciated that, in accordance with one or more aspects described herein, inferences can be made regarding which timing signal to use as a timing reference, which time interval to chose during which to transmit information, an adjustment that should be made to a timing for synchronization, and so forth. As used herein, the term to "infer" or "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more aspects presented above can include making inferences pertaining to selectively adjusting a timing based on a received signal. According to another example, an inference can be made relating to determining whether a timing source is a direct timing source or an indirect timing source and whether the timing source, whether direct or indirect, is reliable. In accordance with another example, an inference can be made relating to choosing a time interval from a multitude of time intervals during which to transmit a signal. It will be appreciated that the foregoing examples are illustrative in nature and are not intended to limit the number of inferences that can be made or the manner in which such inferences are made in conjunction with the various examples described herein.

Figure 10:
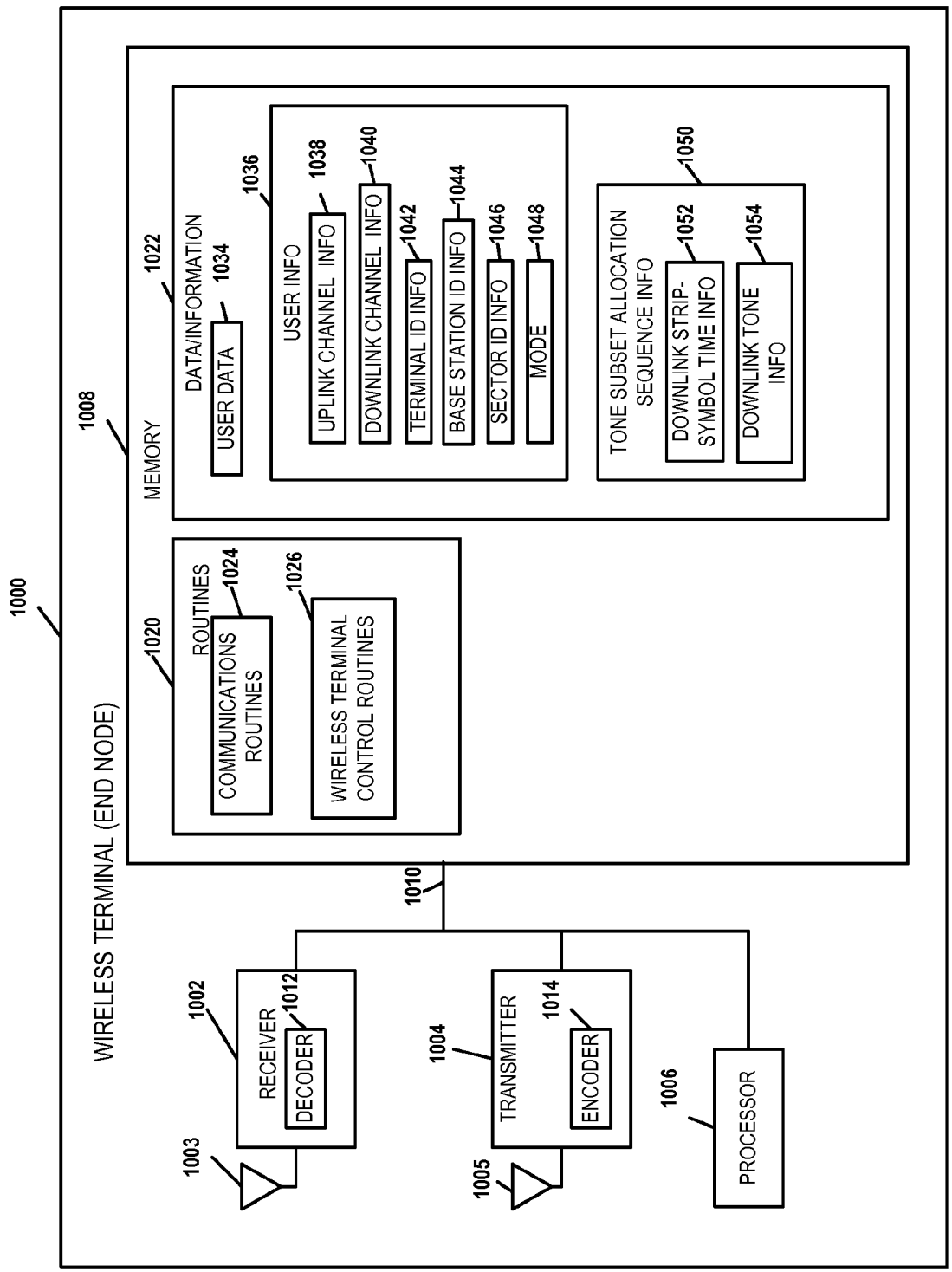
FIG. 10 illustrates an example wireless terminal.

FIG. 10 illustrates an example wireless terminal 1000 that can be used as any one of the wireless terminals (e.g., transmitter node, receiver node, . . . ), of the disclosed aspects. Wireless terminal 1000 includes a receiver 1002 including a decoder 1012, a transmitter 1004 including an encoder 1014, a processor 1006, and memory 1008 which are coupled together by a bus 1010 over which the various elements 1002, 1004, 1006, 1008 can interchange data and information. An antenna 1003 used for receiving signals from a base station and/or other devices is coupled to receiver 1002. An antenna 1005 used for transmitting signals (e.g., to base station and/or other wireless terminals) is coupled to transmitter 1004.

The processor 1006 (e.g., a CPU) controls operation of wireless terminal 1000 and implements methods by executing routines 1020 and using data/information 1022 in memory 1008. Data/information 1022 includes user data 1034, user information 1036, and tone subset allocation sequence information 1050. User data 1034 may include data, intended for a peer node, which will be routed to encoder 1014 for encoding prior to transmission by transmitter 1004 to base station and/or other devices, and data received from the base station and/or other devices, which has been processed by the decoder 1012 in receiver 1002. User information 1036 includes uplink channel information 1038, downlink channel information 1040, terminal ID information 1042, base station ID information 1044, sector ID information 1046, and mode information 1048. Uplink channel information 1038 includes information identifying uplink channels segments that have been assigned by base station for wireless terminal 1000 to use when transmitting to the base station. Uplink channels may include uplink traffic channels, dedicated uplink control channels (e.g. request channels, power control channels and timing control channels). Each uplink channel includes one or more logic tones, each logical tone following an uplink tone hopping sequence. The uplink hopping sequences are different between each sector type of a cell and between adjacent cells. Downlink channel information 1040 includes information identifying downlink channel segments that have been assigned by base station for use when a base station is transmitting data/information to wireless terminal 1000. Downlink channels may include downlink traffic channels and assignment channels, each downlink channel including one or more logical tone, each logical tone following a downlink hopping sequence, which is synchronized between each sector of the cell.

User information 1036 also includes terminal identification information 1042, which is a base station assigned identification, base station identification information 1044 which identifies the specific base station that wireless terminal 1000 has established communications with, and sector identification info 1046 which identifies the specific sector of the cell where wireless terminal 1000 is presently located. Base station identification 1044 provides a cell slope value and sector identification info 1046 provides a sector index type; the cell slope value and sector index type may be used to derive tone-hopping sequences. Mode information 1048 also included in user information 1036 identifies whether the wireless terminal 1000 is in sleep mode, hold mode, or on mode.

Tone subset allocation sequence information 1050 includes downlink strip-symbol time information 1052 and downlink tone information 1054. Downlink strip-symbol time information 1052 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1054 includes information including a carrier frequency assigned to the base station, the number and frequency of tones, and the set of tone subsets to be allocated to the strip-symbol periods, and other cell and sector specific values such as slope, slope index and sector type.

Figure 11:
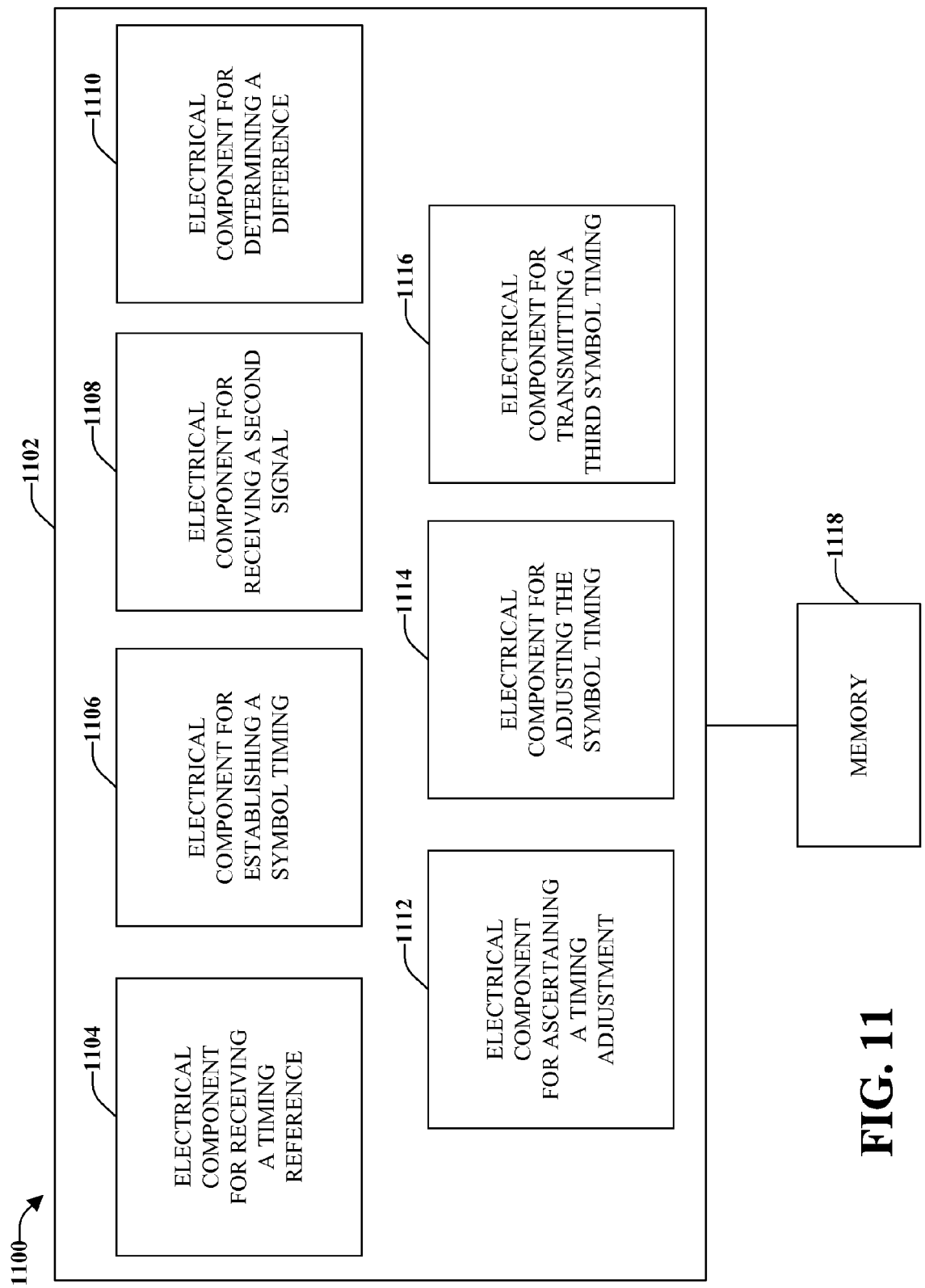
FIG. 11 illustrates another example system that facilitates synchronization in a peer-to-peer wireless communications environment.

Routines 1020 include communications routines 1024 and wireless terminal control routines 1026. Communications routines 1024 control the various communications protocols used by wireless terminal 1000. For example, communications routines 1024 may enable communicating through a wide area network (e.g., with base station) and/or a local area peer-to-peer network (e.g., directly with disparate wireless terminal(s)). By way of further example, communications routines 1024 may enable receiving a broadcast signal (e.g., from base station). Wireless terminal control routines 1026 control basic wireless terminal 1000 functionality With reference to FIG. 11, illustrated is an example system 1100 that facilitates synchronization in a wireless communications network. For example, system 1100 may reside at least partially within a mobile device. It is to be appreciated that system 1100 is represented as including functional blocks, which may be functional blocks that represent functions implemented by a processor, software, or combination thereof (e.g., firmware).

System 1100 includes a logical grouping 1102 of electrical components that can act separately or in conjunction. For instance, logical grouping 1102 may include an electrical component 1104 for receiving a first timing reference. Also included is an electrical component 1106 for establishing a symbol timing based on the first timing reference and an electrical component 1108 for receiving a second signal that includes a second timing reference. Logical grouping 1102 can further include an electrical component 1110 for deciding whether the symbol timing and the second timing reference are different and an electrical component 1112 for ascertaining a timing adjustment based on the symbol timing and the second timing if it is determined that the symbol timing and the second timing reference are different. Also included in logical grouping 1102 can be an electrical component for adjusting the symbol timing based on the timing adjustment and an electrical component for transmitting a third signal with the symbol timing.

The first timing reference can be received from a first source that is at least one of a terrestrial base station transmitter, a terrestrial television or radio transmitter, or a satellite transmitter, or combinations thereof. In accordance with some aspects, logical grouping 1102 can include an electrical component for setting a timing source identifier of a first device as a function of the first source and is set to be an identifier of the first source, the identifier being a non-NULL value.

Additionally or alternatively logical grouping 1102 can include an electrical component for comparing the second timing reference with the symbol timing and an electrical component for determining the timing adjustment to be zero if it is determined that the symbol timing is earlier than the second timing reference Additionally, system 1100 may include a memory 1118 that retains instructions for executing functions associated with electrical components 1104, 1106, 1108, 1110, 1112, 1114, and 1116. While shown as being external to memory 1118, it is to be understood that one or more of electrical components 1104, 1106, 1108, 1110, 1112, 1114, and 1116 may exist within memory 1118.

It is to be understood that the examples described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method comprising:
    operating a first wireless communications device to perform the steps of:
        receiving a first signal including a first timing reference from a first source;
        setting a timing source identifier of the first wireless communications device as a function of the first source, said setting including setting the timing source identifier to a value which does not identify said first source when said first source is a peer wireless terminal;
        determining a symbol timing based on the first timing reference;
        receiving a second signal from at least a second wireless communications device, the second signal including a second timing reference;
        determining whether the symbol timing and the second timing reference are different;
        determining a timing adjustment based on the symbol timing and the second timing reference when it is determined that the symbol timing and the second timing reference are different;
        adjusting the symbol timing based on the timing adjustment; and
        transmitting a third signal with the symbol timing.

2. The method of claim 1, wherein the second timing reference was derived by the second wireless communications device from a second source; and
    wherein said step of determining a timing adjustment includes determining a different timing adjustment when a timing source identifier of the second wireless communications device derived from the second signal is a non-null value than when said timing source identifier of the second device is a null value.

3. The method of claim 1,
    wherein the first source is one of a terrestrial base station transmitter, a terrestrial TV transmitter, a radio transmitter and a satellite transmitter; and
    wherein setting a timing source identifier of the first wireless communications device includes setting the timing source identifier of the first wireless communications device to be an identifier of the first source.

4. The method of claim 1, wherein the first source is at least one of a terrestrial base station transmitter, a terrestrial TV transmitter or a terrestrial radio transmitter which is not part of a peer wireless terminal, or a satellite transmitter, or combinations thereof, and wherein the timing source identifier of the first wireless communications device is set to be an identifier of the first source, the identifier being to a non-NULL value.

5. The method of claim 1, wherein the first source is another wireless device, and wherein the timing source identifier of the first wireless communications device is set to be a NULL value.

6. The method of claim 2, further comprising
    determining, based on the first time reference, a sequence of timing synchronization time intervals;
    prior to receiving the second signal, choosing a fraction in at least one of the timing synchronization time intervals to transmit a signal with the symbol timing; and
    receiving the second signal during a non-chosen fraction of the at least one time interval.

7. The method of claim 6, wherein the chosen fraction is a function of the timing source identifier of the first wireless communications device, the method further comprises deriving the timing source identifier of the second wireless communications device based on the fraction in which the second signal is received in the at least one time interval.

8. The method of claim 7, further comprises determining the timing adjustment to be zero when the timing source identifier of the second wireless communications device is NULL.

9. The method of claim 1, further comprising:
    comparing the second timing reference with the symbol timing; and
    determining the timing adjustment to be zero when it is determined that the symbol timing is earlier than the second timing reference.

10. The method of claim 8, further comprising:
    comparing the second timing reference with the symbol timing; and
    determining the timing adjustment as a function of the second timing reference and setting the timing source identifier of the first wireless communications device to be NULL when it is determined that the second timing reference is earlier than the symbol timing and the second wireless communications device is non-NULL.

11. The method of claim 10, wherein the third signal is transmitted in a fraction of a subsequent timing synchronization time interval, the fraction being a function of the timing source identifier of the first device.

12. The method of claim 11, further comprising:
    dividing a timing synchronization time interval into a plurality of N slots; and
    transmitting the third signal in one of the plurality of N slots as a function of the timing source identifier of the first wireless communications device.

13. The method of claim 12, wherein N is at least 3.

14. The method of claim 12, further comprising:
transmitting the third signal in one of a first predetermined subset of the N slots when the timing source identifier of the first wireless communications device is non-NULL; and
transmitting the third signal in one of a second predetermined subset of the N slots when the timing source identifier of the first wireless communications device is NULL.

15. The method of claim 14, wherein the second predetermined subset includes one slot.

16. A wireless communications apparatus, comprising:
a memory that retains instructions related to receiving a first signal including a first timing reference from a first source, setting a timing source identifier of said wireless communications apparatus as a function of the first source, said setting including setting the timing source identifier to a value which does not identify said first source when said first source is a peer wireless terminal, determining a symbol timing based on the first timing reference, receiving a second signal that includes a second timing reference from a second source, finding a difference between the symbol timing and the second timing reference, using the found difference to determine a timing adjustment, adjusting the symbol timing based on the determined timing adjustment, and transmitting a third signal with the symbol timing; and
a processor, coupled to the memory, configured to execute the instructions retained in the memory.

17. The wireless communications apparatus of claim 16, wherein the first source is one of a terrestrial base station transmitter, a terrestrial TV transmitter, a radio transmitter and a satellite transmitter; and
wherein setting a timing source identifier of the wireless communications apparatus includes setting the timing source identifier of said wireless communications apparatus to be an identifier of the first source.

18. The wireless communications apparatus of claim 16, the memory further retains instructions related to determining a sequence of timing synchronization time intervals based on the first time reference, choosing a fraction in at least on the time synchronization time intervals to transmit a signal with the symbol timing, and receiving the second signal during a non-chosen fraction of the at least one time interval.

19. The wireless communications apparatus of claim 16, the memory further retains instructions related to comparing the second timing reference with the symbol timing, determining the timing adjustment as a function of the second timing reference, and setting said timing source identifier of the wireless communications apparatus to NULL when it is determined that the second timing reference is earlier than the symbol timing and the second source is non-NULL.

20. The wireless communications apparatus of claim 16, the memory further retains instructions related to comparing the second timing reference with the symbol timing and determining that the timing adjustment is zero when it is determined that the symbol timing is earlier than the second timing reference.

21. The wireless communications apparatus of claim 16, the memory further retains instructions related to dividing a timing synchronization time interval into a plurality of N slots, transmitting the third signal in one of the plurality of N slots as a function of the timing source identifier, transmitting the third signal in one of a first predetermined subset of the N slots when the timing source identifier of the wireless communications apparatus is non-NULL, and transmitting the third signal in one of a second predetermined subset of the N slots when the timing source identifier is NULL.

22. A wireless communications apparatus that facilitates synchronization in a peer-to-peer communications network, comprising:
means for receiving a first signal including a first timing reference;
means for setting a timing source identifier of said wireless communications apparatus as a function of the first source, said mean for setting being configured to set the timing source identifier to a value which does not identify said first source when said first source is a peer wireless terminal;
means for establishing a symbol timing based on the first timing reference;
means for receiving a second signal that includes a second timing reference;
means for deciding whether the symbol timing and the second timing reference are different;
means for ascertaining a timing adjustment based on the symbol timing and the second timing reference when it is determined that the symbol timing and the second timing reference are different;
means for adjusting the symbol timing based on the timing adjustment; and
means for transmitting a third signal with the symbol timing.

23. The wireless communications apparatus of claim 22, wherein the first source is at least one of a terrestrial base station transmitter, a terrestrial television or radio transmitter, or a satellite transmitter, or combinations thereof; and
wherein said means for setting a timing source identifier of the wireless communications apparatus include means for setting the timing source identifier to be an identifier of the first source, the identifier being a non-NULL value.

24. The wireless communications apparatus of claim 22, further comprising:
means for comparing the second timing reference with the symbol timing; and
means for determining the timing adjustment to be zero when it is determined that the symbol timing is earlier than the second timing reference.

25. A non-transitory machine-readable medium having stored thereon machine-executable instructions for:
receiving at a first device a first signal including a first timing reference from a first source;
setting a timing source identifier of the first device as a function of the first source, said setting including setting the timing source identifier to a value which does not identify said first source when said first source is a peer wireless terminal;
determining a symbol timing based on the first timing reference;
receiving a second signal from at least a second wireless device, the second signal including a second timing reference;
determining whether the symbol timing and the second timing reference are different;
determining a timing adjustment based on the symbol timing and the second timing when it is determined that the symbol timing and the second timing reference are different;
adjusting the symbol timing based on the timing adjustment; and
transmitting a third signal with the symbol timing.

26. In a wireless communication system, an apparatus comprising:
a processor configured to:
receive a first signal including a first timing reference from a first timing source;
setting a timing source identifier of said apparatus as a function of the first timing source, said setting including setting the timing source identifier to a value which does not identify said first source when said first source is a peer wireless terminal;
establish a symbol timing based on the first timing reference;
accept a second signal from a wireless device, the second signal including a second timing reference;
establish whether the symbol timing and the second timing reference are different;
select a timing adjustment based on the symbol timing and the second timing reference when it is determined that the symbol timing and the second timing reference are different;
change the symbol timing based on the selected timing adjustment; and
transmit a third signal with the symbol timing.

* * * * *